US012197772B2

(12) United States Patent
Bert (10) Patent No.: US 12,197,772 B2
(45) Date of Patent: Jan. 14, 2025

(54) SUPPORTING MULTIPLE ACTIVE REGIONS IN MEMORY DEVICES

(71) Applicant: Micron Technology, Inc., Boise, ID (US)

(72) Inventor: Luca Bert, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/208,653

(22) Filed: Mar. 22, 2021

(65) Prior Publication Data
US 2022/0300195 A1 Sep. 22, 2022

(51) Int. Cl.
*G06F 3/06* (2006.01)

(52) U.S. Cl.
CPC .......... *G06F 3/0656* (2013.01); *G06F 3/0604* (2013.01); *G06F 3/064* (2013.01); *G06F 3/0679* (2013.01)

(58) Field of Classification Search
USPC ........................................... 711/154
See application file for complete search history.

(56) References Cited

U.S. PATENT DOCUMENTS

| | | | | |
|---|---|---|---|---|
| 9,838,500 B1* | 12/2017 | Ilan | ..................... | G06F 12/0875 |
| 10,817,421 B2 | 10/2020 | Talagala et al. | | |
| 11,126,378 B1* | 9/2021 | Parker | ................. | G06F 11/1048 |
| 11,586,385 B1* | 2/2023 | Lercari | ..................... | G06F 1/30 |
| 2013/0067144 A1* | 3/2013 | Namba | .................. | G06F 3/065 |
| | | | | 711/E12.001 |
| 2015/0221382 A1 | 8/2015 | Jung et al. | | |
| 2015/0248138 A1* | 9/2015 | Feero | ..................... | G06F 1/3275 |
| | | | | 713/400 |
| 2016/0147482 A1 | 5/2016 | Jang et al. | | |
| 2019/0096452 A1 | 3/2019 | Branch et al. | | |
| 2019/0114255 A1* | 4/2019 | Jain | ......................... | G06F 3/068 |
| 2019/0187931 A1* | 6/2019 | Byun | ................... | G06F 13/1642 |
| 2019/0196723 A1 | 6/2019 | Yano et al. | | |
| 2020/0118585 A1* | 4/2020 | Gerhart | ..................... | G06F 13/00 |
| 2020/0150898 A1* | 5/2020 | Byun | ...................... | G06F 3/064 |
| 2020/0210074 A1* | 7/2020 | Nakashita | ............... | G06F 3/065 |
| 2021/0064297 A1* | 3/2021 | Nakao | .................... | G06F 3/0644 |
| 2021/0263682 A1* | 8/2021 | Jeon | ...................... | G06F 3/0638 |
| 2022/0035561 A1* | 2/2022 | Ha | ......................... | G06F 3/0656 |
| 2022/0050626 A1* | 2/2022 | Oh | ......................... | G06F 3/0611 |
| 2022/0137817 A1* | 5/2022 | Kwak | ................... | G06F 3/0635 |
| | | | | 711/154 |

FOREIGN PATENT DOCUMENTS

JP 2010233235 A * 10/2010 ............. G10L 19/22

OTHER PUBLICATIONS

International Search Report and Written Opinion for International application No. PCT/US2022/021211, mailed Jun. 24, 2022, 9 pages.

* cited by examiner

Primary Examiner — Yaima Rigol
Assistant Examiner — Elias Young Kim
(74) *Attorney, Agent, or Firm* — Lowenstein Sandler LLP (57) ABSTRACT

Host data associated with a first region of a memory device is identified. The host data is stored in a buffer, and the first region of the memory device is designated as open. The host data is padded to a predetermined size and written to the first region of the memory device. A context associated with the first region of the memory device is updated. The first region of the memory device is designated as closed.

16 Claims, 6 Drawing Sheets

```
┌─────────────────────────────────────────────────────────────┐
│ Identify host data associated with a first region of a memory device, │
│ wherein the host data is stored in a buffer, and wherein the first region of │
│         the memory device is designated as open.            │
│                          510                                │
└─────────────────────────────────────────────────────────────┘
                              ↓
┌─────────────────────────────────────────────────────────────┐
│            Pad the host data to a predetermined size.       │
│                          520                                │
└─────────────────────────────────────────────────────────────┘
                              ↓
┌─────────────────────────────────────────────────────────────┐
│      Write the padded host data to the first region of the memory device.   │
│                          530                                │
└─────────────────────────────────────────────────────────────┘
                              ↓
┌─────────────────────────────────────────────────────────────┐
│ Determine a write pointer offset associated with the first region of the │
│                       memory device.                        │
│                          540                                │
└─────────────────────────────────────────────────────────────┘
                              ↓
┌─────────────────────────────────────────────────────────────┐
│ Update a context associated with the first region of the memory device, │
│  wherein the context comprises the write pointer offset.    │
│                          550                                │
└─────────────────────────────────────────────────────────────┘
                              ↓
┌─────────────────────────────────────────────────────────────┐
│ Designate, based on the context, the first region of the memory device as │
│                           closed.                           │
│                          560                                │
└─────────────────────────────────────────────────────────────┘
```

SUPPORTING MULTIPLE ACTIVE REGIONS IN MEMORY DEVICES

TECHNICAL FIELD

Embodiments of the disclosure relate generally to memory sub-systems, and more specifically, relate to an efficient method to supporting multiple active regions in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to supporting multiple active regions in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data in the memory device at the memory sub-system and to read data from the memory device of the memory sub-system.

The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g., used to distinguish age of data written), valid bitmap (which LBA values or logical transfer units contain valid data), and the like. For simplicity, where "data" is referred to hereafter, such data can be understood to refer to at least host data, but can also refer to other data such as media management data and/or system data.

Memory sub-system controllers can receive multiple write requests from a host system, which can be configured to execute the write requests in parallel. One example of a memory sub-system configured to execute multiple write requests in parallel is known as zoned namespaces (ZNS). The present disclosure uses zoned namespaces as an illustrative example, however aspects of the present disclosure can be implemented in other configurations in which parallel writing is enabled, such as an open channel configuration.

In a zoned namespace (ZNS), the address space (e.g., logical block address space) of the memory device (or memory sub-system) is divided into regions (or zones), which allows for more efficient management of data as the capacity of the memory device increases. For example, each individual region can be designated for use by a specific client application executed by the host system or some other system with access to the memory device. In a memory device or memory sub-system, one or more zoned namespaces can be implemented, and each zoned namespace can implement one or more regions. A region can include multiple memory units. A memory unit can refer to a plane, a block, a page, a cell, a zone, a region, or any other segment of memory. Each region can be addressed using a portion of the address space of the memory device or memory sub-system.

Data can be written to a particular region sequentially and independently from other regions. A region is defined as open when it can be actively written to. A region is defined as active when it is in writing mode, but cannot be actively written to. A memory sub-system can configure two maximum capabilities: a maximum number of open regions (MOR) and a maximum number of active regions (MAR). The MOR defines the number of regions that can be written to in parallel before the memory sub-system reaches its performance and/or power limitations. The MAR defines the maximum of regions that can be active (i.e., in writing mode), but that are not actively being written to. An active region can be one that has been written to but is not full. Hence, MOR reflects the maximum performance of a memory sub-system, while the MAR reflects how many threads the memory sub-system can manage. In order to write to an active region that is not currently open, the memory sub-system can select an open region to close.

A host system (e.g., a filesystem operating on a host system) can send write requests in blocks as small as 4 kilobytes (KB) in size, while a ZNS memory device can have an optimal write size that is in the range of approximately 100 KB (e.g., 64 KB, 128 KB, 196 KB). The memory sub-system controller can determine the optimal ZNS memory device write size based on, for example, the specifications of the ZNS memory device. In order to execute the smaller write requests received from the host system, memory sub-system controllers can store the host data temporarily (e.g., in a write buffer) in a volatile memory device (e.g., a dynamic random access memory (DRAM) device) until the stored host data in the write buffer reaches the predetermined write size of the ZNS memory device, as determined by the memory sub-system controller. Once the predetermined ZNS memory device write size is reached, the memory sub-system controller can flush the host data to the underlying main storage media (e.g., NAND).

In many memory sub-systems, not all active regions are open at the same time. Hence, the MAR can exceed the MOR. However, in order to execute write requests that include host data smaller than the predetermined write size of the ZNS memory device, the memory sub-system controller maintains a write buffer for the active regions, which can limit the number of active that a memory sub-system can support. For example, if a write request can contain data as small as 4 KB, but the predetermined write size for the underlying memory device is 64 KB, the memory sub-system can maintain a 60 KB write buffer for each active region. Memory sub-systems may not have sufficient capacity to maintain a 60 KB write buffer for a large number of active regions. Furthermore, the write buffers associated with each active region can be flushed to the underlying main storage media responsive to a power event (e.g., a power down event, an asynchronous power loss event, etc.). Memory sub-systems can have a limited number of power capacitors, which limits the number of active regions that can be flushed during a power event, thus further limiting the number of active regions a memory sub-system can support.

Aspects of the present disclosure address the above and other deficiencies by having a memory sub-system that efficiently supports a large number of active regions in memory devices by reducing the amount of data stored in the write buffers. Using embodiments described herein, a memory sub-system can expose a maximum number of active regions (MAR) that far exceeds the maximum number of open regions (MOR). In implementations, the MAR can exceed the MOR by tenfold, or hundredfold. In embodiments, the memory sub-system can receive a request to open an active region. That is, the memory sub-system can receive a write request directed to a region that is active but not currently open. The memory sub-system controller can select an open region to evict (referred to as a victim region), according to internal policies. Evicting an open region refers to the process of closing the victim region being evicted, writing host data stored in a write buffer associated with the victim region, and releasing the resources (e.g., write buffer) used by the victim region. Evicting an open region enables the memory sub-system controller to open an active region that is to be written to.

Upon selecting a victim open region to evict, the memory sub-system controller can determine whether the victim open region has associated host data stored in a write buffer. Host data is stored in a write buffer associated with an open region when the host data is smaller than the predetermined write size for the underlying memory device. That is, in the example described above, the host can send write requests for data in increments as small as 4 KB. However, the memory sub-system controller can determine that the write size for the underlying memory device (e.g., for a NAND device), is 64 KB. Hence, when the memory sub-system controller receives a write request that contains data that is less than 64 KB directed to a particular open region, the memory sub-system controller stores the data in a write buffer associated with the particular open region. As the memory sub-system controller receives additional write requests directed to the particular open region, the memory sub-system controller adds the data to the write buffer associated with the particular open region. Once the write buffer reaches the predetermined write size (e.g., 64 KB), the memory sub-system controller writes the data stored in the write buffer to the underlying memory device on which the region resides.

To successfully evict a victim open region that has data stored in an associated write buffer, the memory sub-system transfers the host data associated with the victim open region to the underlying memory device. This way, once the victim open region is evicted, the write buffer that was used by the victim open region can be released and can be used by an active region. However, the host data stored in the write buffer can be smaller than the predetermined write size of the underlying memory device. As such, the memory sub-system controller can pad the write buffer associated with the victim open region to the predetermined write size. Padding data can refer to adding a default set of data to the buffered host data to reach the predetermined write size. The default set of data represents random data that is used to pad the host data stored in the buffer. The default set of data can be randomly generated data, data generated according to an algorithm, or can be all zeros, for example. In embodiments, the default set of data added to the write buffer is not valid data. The memory sub-system controller can flag the data as invalid, and can return an error if a host system attempts to read the default of set of data used to pad the write buffer. Additionally or alternatively, the memory sub-system controller can pad both the data and the ECC to prevent a read of the invalid data.

In embodiments, the memory sub-system controller and/or the host system can enable a flexible zone size feature, which allows for variations in the size of the memory regions. The memory sub-system may not inform the host system that it has padded the host data prior to writing it to the underlying memory device on which the region resides. When the memory region reaches full capacity, the memory sub-system controller can inform the host system that the memory region is full. Even though the size of data actually stored in the memory region may not be the same as the size of data sent by the host system, the host system can mark the memory region as full because the flexible zone size feature is enabled.

In embodiment, the memory sub-system and the host system can enable append mode. In append mode, a host system can send an append command. The append command can include host data, and can specify the first logical block of a region as the write position. The append command instructs the memory sub-system controller to append data to the memory region that begins with the first logical block specified in the command. The memory sub-system writes the data to the next available LBA in the memory region, and informs the host system at which LBA the data was written. Whereas traditional write commands are executed in the order in which they were received when writing to sequentially written memory devices, append mode enables a host system to send multiple append commands that can be executed in any order. Furthermore, using append mode enables the memory sub-system controller to pad host data before writing to the memory device. The memory sub-system can advance a write pointer to the next writeable LBA of the memory region, and upon receiving an append command, can write the data to the next writeable LBA. When append mode is enabled, the host system may not keep track of the next writeable LBA of the memory region.

The memory sub-system controller can write the padded data to the underlying main memory. The memory sub-system controller can then update the context associated with the region and save the region context in the volatile memory. The region context is a data structure which can include the start LBA of the region, the write pointer associated with the region, and/or any associated flags. The region context is relatively small in size; it can be as small as 32 bytes.

According to embodiments, because the memory sub-system controller writes the host data stored in the write buffer associated with a region to the underlying main memory prior to closing the region, the memory sub-system controller may not maintain a write buffer associated with each active region. Rather, the memory sub-system controller can maintain a write buffer for each open region, and can maintain a context data structure for each active region. The region context is much smaller in size compared to the write buffer, and hence the memory sub-system controller can maintain a much larger MAR compared to conventional memory sub-systems that saved a write buffer for each active region. Furthermore, responsive to a power event (e.g., a power down event, an asynchronous power loss, etc.), the write buffers of the open regions and the region context of the active regions are saved to the non-volatile memory to avoid losing data. Thus, by implementing embodiments described herein, memory sub-systems can support a large number of active regions before reaching performance and/or power limitations.

Advantages of the present disclosure include, but are not limited to, reducing the amount of data stored in temporary write buffers, thus reducing the number of power capacitors needed in a power event of the memory sub-system. Specifically, upon a power failure, the data structure associated with the MAR is much smaller than in conventional systems. For example, by avoiding keeping buffered data in RAM for each active region and limiting the structure saved to just the context, the data structure required to be saved is manageable even for a very large MAR. For example, the context associated with each active region can be 32 bytes, while the buffered data can be up to 60 kilobytes. By limiting the structure saved to only the context, embodiments described herein can accommodate many more active regions (in the example provided above, in which the context is 32 bytes and the buffered data is 60 KB, embodiments described herein can accommodate nearly 2,000 times higher MAR). Furthermore, by enabling a higher number of maximum active regions, the host system can experience lower latency with regard to write operations.

Figure 1:
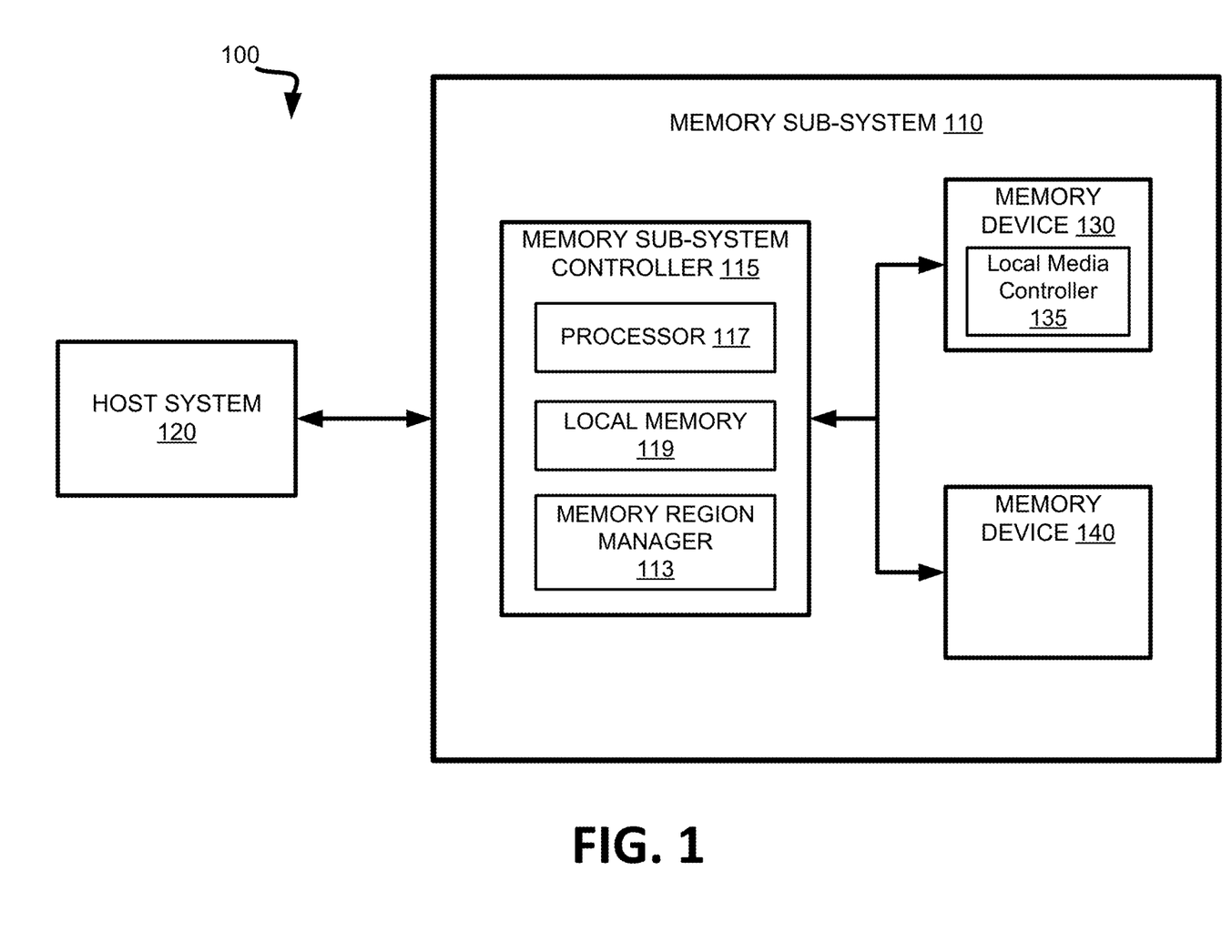
FIG. 1 illustrates an example computing system that includes a memory sub-system, in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a memory region manager 113 that can support a large number of maximum active regions by efficiently swapping open and active regions. In some embodiments, the memory sub-system controller 115 includes at least a portion of the memory region manager 113. In some embodiments, the memory region manager 113 is part of the host system 120, an application, or an operating system. In other embodiments, local media controller 135 includes at least a portion of memory region manager 113 and is configured to perform the functionality described herein.

The memory region manager 113 can efficiently evict an open region in order to make room for opening an active region. The memory region manager 113 can receive a write operation from the host system 120. The host write operation can be directed to an active, but not currently open, memory region (e.g., a zone in a ZNS) in memory device 130. A memory region designated as open can be successfully written to. In order to execute the write operation directed to the active memory region, the memory region manager 113 can select an open memory region to evict. That is, the memory region manager 113 can select a memory region that is designated as open (e.g., that has a flag stored in the memory region context that identifies the memory region as open). Upon selecting an open memory region to evict, the memory region manager 113 can determine whether the memory region has associated host data stored in a buffer, awaiting to be written to the memory device on which the region resides. As described above, write operations received from the host system 120 can be as small as 4 KB, while write commands executed on the memory device 130 can have a write size that is in the range of approximately 100 KB (e.g., 64 KB, 128 KB, 196 KB). The write size can be a predetermined size specified by the memory sub-system controller. Hence, for each write operation received from the host system 120 that is smaller than the predetermined write size, the memory region manager 113 can store the data in a memory buffer residing on a volatile memory device. When the memory buffer reaches the predetermined write size, the memory region manager 113 can transfer the data from the memory buffer to memory device 130.

In embodiments of the present disclosure, upon selecting a memory region to evict (referred to as the victim memory region), the memory region manager 113 can determine whether the victim memory region has associated data stored in a memory buffer. If not, the memory region manager 113 can designate the victim memory region as closed. However, if the victim memory region has associated data stored in a memory buffer, the memory region manager 113 can pad the memory buffer associated with the victim memory region to the predetermined write size with a default set of data in order to successfully flush the write buffer to the memory device. The default set of data represents random data that is used to pad the host data stored in the buffer. The default set of data can be randomly generated data, data generated according to an algorithm, or can be all zeros, for example. In embodiments, the default set of data added to the write buffer is not valid data. The memory sub-system controller can flag the data as invalid, and can return an error if a host system attempts to read the default of set of data used to pad the write buffer. The memory sub-system controller can maintain, in a data structure, an indication of the data in each region that is invalid data. For example, the memory sub-system can maintain metadata associated with each region, and the metadata can distinguish between host data and padding added to the region. The metadata can specify the LBA at which the padding was added, for example. Additionally or alternatively, the memory sub-system controller can pad both the data and the ECC to prevent a read of the invalid data. That is, when the memory sub-system controller compares the data to the ECC, the comparison may fail and signal to the controller that the data is invalid. The memory sub-system controller can remove the padding from the data and from the ECC prior to returning a read request to the host system.

The memory region manager 113 can then transfer the padded memory buffer to memory device 130 and designate the victim memory region as closed. Once the victim memory region is designated as closed, the resources associated with the victim memory region can be released. The write operation received by the host system 120, directed to an active but not open memory region, can utilize the released resources. The memory region can be designated as open and the write operation can be executed. Further details with regards to the operations of the memory region manager 113 are described below.

Figure 2:
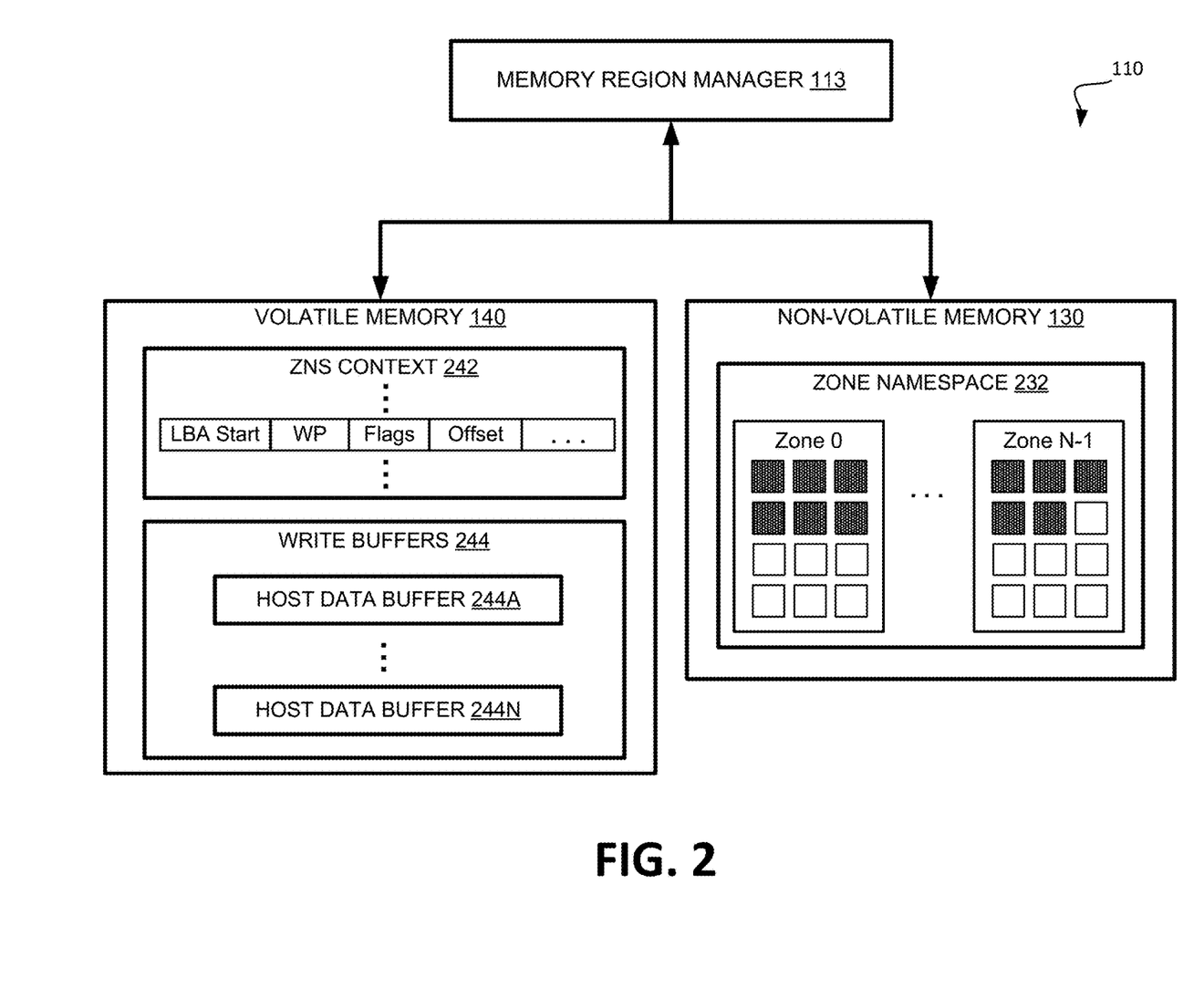
FIG. 2 is a block diagram illustrating operation of a memory region manager performing enhanced maximum active region support for a memory sub-system with zoned namespace memory, in accordance with some embodiments of the present disclosure.

FIG. 2 is a block diagram illustrating operation of a memory region manager 113 performing enhanced MAR support for a memory sub-system 110 with zone namespace memory, in accordance with some embodiments of the present disclosure. In one embodiment, memory region manager 113 is operatively coupled with memory device 130 and memory device 140 via one or more electrical connections (e.g., one or more buses). Non-volatile memory device 130 can be configured with a zone namespace 232. In zone namespace 232, the address space of memory device 130 is divided into zones which allows for more efficient management of data. Zone namespace 232 can be optimized to accept write requests from host system 120, via memory region manager 113, using a corresponding write size granularity. For example, zone namespace 232 can have a predetermined write size that is in the range of approximately 100 KB (e.g., 64 KB, 128 KB, 196 KB). This write size granularity may be different than a write size granularity used by the host system (e.g., by the filesystem of the host system), and used to write to volatile memory device 140, which may be, for example, approximately 4 KB. In addition, in zone namespace 232, writes are performed sequentially starting from the beginning of each zone.

Zone namespace 232 can be implemented using zone namespace (ZNS) context 242. In embodiments, ZNS context 242 can be a data structure that stores a minimal set of data that can be saved in case of an interrupt or power failure. The ZNS context 242 can have multiple entries, each entry identifying information about a zone. In the illustrative example, the ZNS context 242 includes an LBA start address, a write pointer (WP), one or more flags, and an offset value. In other embodiments, the ZNS context 242 can include additional or fewer data items. LBA Start in ZNS context 242 indicates the starting LBA associated with each zone. The WP of each zone can indicate the LBA of the next write to the zone. The flags can indicate whether the zone is open/closed, active, full, partially full, etc. The offset value can represent a write pointer offset, used in the append mode disabled embodiment described below.

In embodiments, volatile memory device 140 can also store write buffers 244. Write buffers 244 store host data that has not yet reached the predetermined write size associated with the ZNS memory device 130. For each write operation received from the host system 120 that is smaller than the predetermined write size, the memory region manager 113 can store the data in a write buffer (e.g., host data buffer 244A-244N). When the memory buffer reaches the predetermined write size, the memory region manager 113 can transfer the data in the host data buffer 244A-244N to the corresponding zone in memory device 130 (e.g., to ZNS 232). The memory region manager 113 can maintain a write buffer (e.g., host data buffer 244A-244N) for each open region.

As described above, the memory region manager 113 can select a victim memory region to evict in order to execute a newly received write request directed to an active memory region. In embodiments, the memory region manager 113 can determine whether the victim memory region has data in an associated host data buffer 244A-244N. If so, the memory region manager 113 can pad the host data buffer 244A-244N to the predetermined write size and transfer the host data buffer 244A-244N to ZNS 232 of memory device 130. Upon transferring the host data buffer 244A-244N associated with the victim memory region, the memory region manager 113 can update the ZNS context 242 associated with the victim memory region. Specifically, the memory region manager 113 can update the flag associated with the memory region to designate the zone as closed. The memory region manager 113 can advance the write pointer associated with the memory region to reflect the next writeable LBA of the memory region. The use of write pointers is further described in conjunction with FIGS. 3A and 3B.

In embodiments, the host system 120 (e.g., a filesystem executed on host system 120) can keep track of data placement within each memory region, and can keep track of each memory region's state. The host system 120 can keep track of the LBA corresponding to the start of each memory region, as well as the current write pointer of each memory region. Notably, when the memory region manager 113 pads the host data buffer 244A-244N with a default set of data and transfers the padded set of data to memory device 130, the memory region data maintained by the host system 120 no longer matches the ZNS context 242 of the memory sub-system. As such, the memory region can reach full capacity before the memory region data maintained by host system 120 indicates full capacity.

For example, memory region manager 113 can receive a write operations that includes 4 KB of data directed to open Zone 0 of ZNS 232. In response to determine that the data in the write operation does not reach the predetermined write size of 64 KB, the memory region manager 113 can store the 4 KB of data in host data buffer 244A. Memory region manager 113 can receive a second write operation that includes 8 KB of data directed to closed Zone N-1. Based on internal policies, memory region manager 113 can decide to evict zone 0 in order to open zone N-1. Hence, memory region manager 113 can identify the host buffer associated with Zone 0 (i.e., host data buffer 244A), pad the host data with a 60 KB default set of data (i.e., the predetermined write size of 64 KB minus 4 KB stored in the host data buffer 244A), and write the padded host data to Zone 0 in ZNS 232. The memory region manager 113 pads the data prior to writing it to the zone to avoid writing data writing data that does not meet the specifications of the memory device (i.e., the predetermined write size). The memory region manager 113 can then close Zone 0 and open Zone N-1. As a result, memory region manager 113 can use host data buffer 244A to store the 8 KB of data received in the second write operation directed to Zone N-1. However, in this example, the host system that sent the first write operation may not have been notified that memory region manager 113 wrote an additional 60 KB of data to Zone 0. Hence, Zone 0 can store 60 KB more data than the host system is aware of, and Zone 0 can reach full capacity before the host system's region management data indicates the zone as full.

In order to account for such discrepancies, the memory sub-system controller 115 and the host system 120 are configured to enable flexible memory region (zone) sizes. When flexible zone size is enabled, not every memory region has the same size; the size of each memory region can vary. As such, when a memory region reaches fully capacity, the memory region manager 113 can inform the host system 120 that the memory region is full, even though the host system 120 memory region management data may not reflect that (e.g., the host system 120's region management data may indicate that Zone 0 has 60 KB left, while in reality the zone was filled with padded default data). Because the zone sizes are flexible, the host system 120 can accept the indication from the memory region manager 113 that a particular zone is full.

In some embodiments, the host system is configured to enable append mode, in which the host can send append commands to the memory sub-system. An append command is a write operation that specifies the first logical block of a region as the write position, rather than the actual write position associated with the memory region. The append command instructs the memory sub-system controller to append the data to the memory region that begins with the LBA specified in the append command. The memory sub-system controller then writes the data specified in the append command at the current write pointer position of the indicated memory region. The memory sub-system controller issues a command completion response, which includes the effective write position for the data (i.e., the LBA at which the data was written). Enabling the append mode allows the host system to issue several append operations, which the memory sub-system controller can complete in any order. In embodiments in which append mode is enabled, the memory region manager 113 can send a notification to the host system 120 indicating at which LBA the host data is written.

In some embodiments, the host system sends a conventional write operation (rather than an append command) in which the operation is addressed to the LBA currently pointed to by the memory region's write pointer (WP). In embodiments in which the append mode is not enabled, the LBA specified in the write operation matches the WP in the ZNS context 242 associated with the memory region to which the write operation is directed. However, as described above, once the memory region manager 113 has transferred the padded host data buffer 244A-244B to the associated memory region in ZNS 232, the memory region's current next-writable address no longer matches the WP maintained by the host system 120 (because, for example, the memory region manager 113 added an extra 60 KB to the memory region, which the host system may not be aware of). To account for such discrepancies, the memory region manager 113 can store a write pointer offset in the ZNS context 242. The write pointer offset can represent the difference between the WP associated with the memory region data and the actual next-writable address of the memory region. As such, when the memory region manager 113 receives a write operation from the host system 120 in which the write operation specifies an LBA at which to store the host data, the memory region manager 113 can add the write pointer offset associated with the memory region to write the data at the appropriate location.

In an example, the offset can represent the number of times the memory region manager 113 padded the host data prior to transferring the host data to the memory region (or zone) of the memory device on which the memory region resides (i.e., the number of times the memory region has been evicted while storing associated data in a buffer). If the memory region manager 113 padded the host data associated with a memory region prior to transferring the host data to the memory region on one occasion, the write pointer associated the memory region can differ from the actual next writeable address associated with the memory region by one. Hence, the next write command associated with that memory region can be written at the write pointer plus the offset (i.e., plus one). Additionally, upon receiving a read operation from a host system indicating a particular LBA at which the data is written, the memory region manager 113 can apply the same offset to identify the data to be read.

Figure 3A:
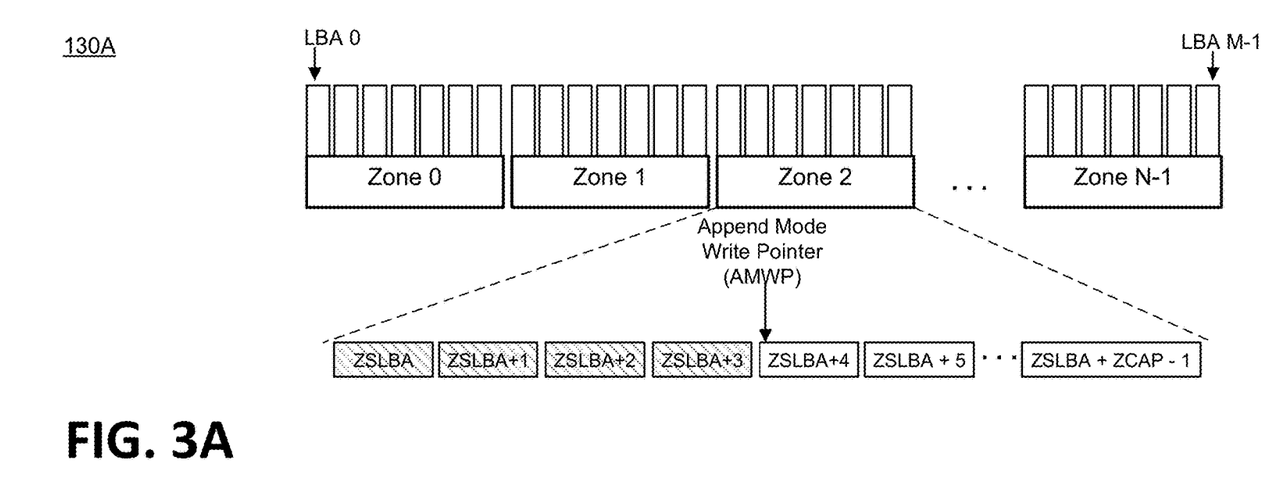
FIGS. 3A and 3B are schematic diagrams that illustrate the use of a write pointer, in accordance with embodiments of the present disclosure.
Figure 3B:
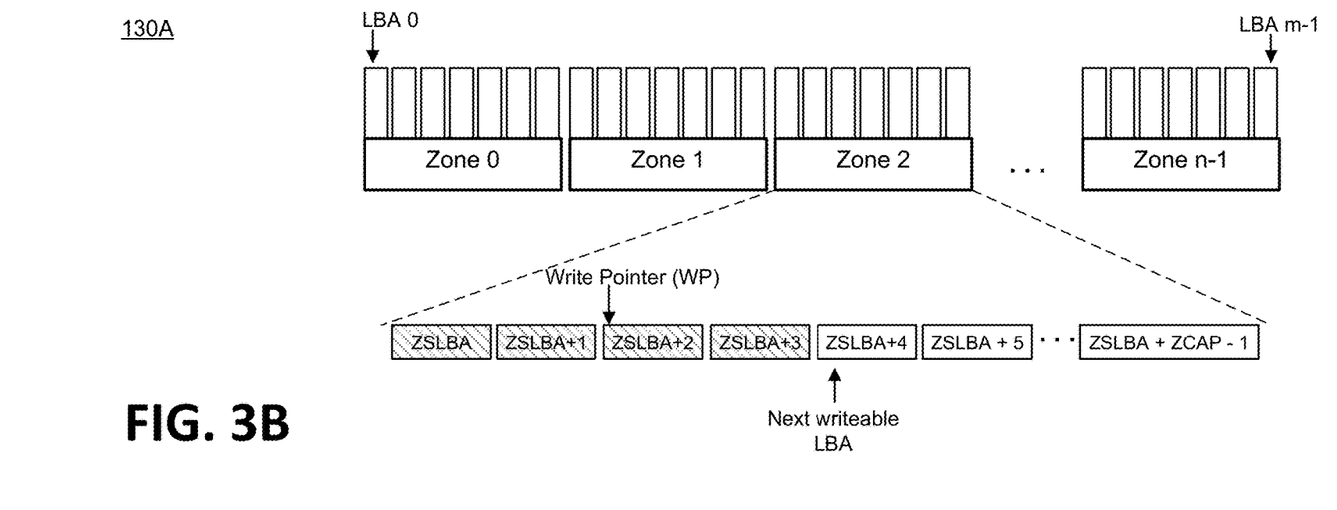

FIGS. 3A and 3B are schematic diagrams that illustrate the use of a write pointer using append mode (FIG. 3A) and using a traditional write operation (FIG. 3B), in accordance with embodiments of the present disclosure. The illustrated zones (Zone 0, Zone 1, Zone 2, . . . Zone N-1) can be understood to be part of the memory device 130 discussed with reference to FIGS. 1 and 2. The LBA range can be ordered in these zones, e.g., from zero ("LBA 0") at the beginning and sequentially written to the zones through LBA M-1 at the end of the Zone N-1. By way of example, and for explanatory purposes only, the memory cells of Zone 2 are illustrated in more detail. Each zone can be composed of multiple block-sized groups of cells, where each physical block is broken into smaller pages, blocks, or units of memory cells. As illustrated, therefore, the first units of memory cells of Zone 2 (ZSLBA, ZSBLA+1, ZSLBA+2, and ZSLBA+3) have been written (or programmed) already, and thus are shaded with a pattern. A number of additional units of memory cells have not been written and are thus not shaded, all the way through and to include a final unit, which is labeled as ZSLBA+ZCAP-1.

Referring to FIG. 3A, the Append Mode Write Pointer (AMWP) for writing to the memory device 130 is illustrated as being located at the beginning of the unwritten blocks within Zone 2, where Zone 2 is an open zone currently being programmed. In embodiments, the memory region manager 113 can receive an append command. The append command can include data to be written to a particular zone. For example, the append command can include data to be written to Zone 2 of FIG. 3A. For explanatory purposes, the entry in ZNS Context 242 (in FIG. 2) for Zone 2 would include LBA Start as ZSLBA, WP as Append Mode Write Pointer (WP) pointing to ZSLBA+4, and the flag would indicate the zone as open. With append mode enabled, the offset in ZNS Context 242 is not needed.

The append command can specify the zone start ZSLBA as the write position. Upon receiving the append command, the memory region manager 113 can identify the context associated with the write position (i.e., using the ZNS Context 242 can identify Zone 2 as being associated with ZSLBA). If the size of data in the append command matches the predetermined size, the memory region manager 113 can write the data included in the append command at WP indicated in the context associated with Zone 2 (i.e., at Append Mode Write Pointer (WP), starting at ZSLBA+4). The memory region manager 113 can then send a notification to the host system indicating at which LBA (i.e., ZSLBA+4) the data was written.

Referring to FIG. 3B, the Write Pointer (WP) for writing to the memory device 130 is illustrated as being located at ZSLBA+2 within Zone 2, where Zone 2 is an open zone currently being programmed. In embodiments, the memory region manager 113 can receive a write operation. Write operations specify the LBA at which to write the data. For explanatory purposes, the entry in ZNS Context 242 of FIG. 2 for Zone 2 would include LBA Start as ZSLBA, WP as Write Pointer (WP) pointing at ZSLBA+2, and the write pointer offset would be 2. Upon receiving the write operation, the memory region manager 113 can, using the ZNS Context 242, identify the context associated with the write command, and can identify the write pointer offset. The next writable LBA in Zone 2 is the write pointer stored in the ZNS context 242 plus the write pointer offset stored in ZNS context 242. The memory region manager 113 can write the data included in the write operation at WP plus the write pointer offset, i.e., at ZSLBA+4.

Figure 4:
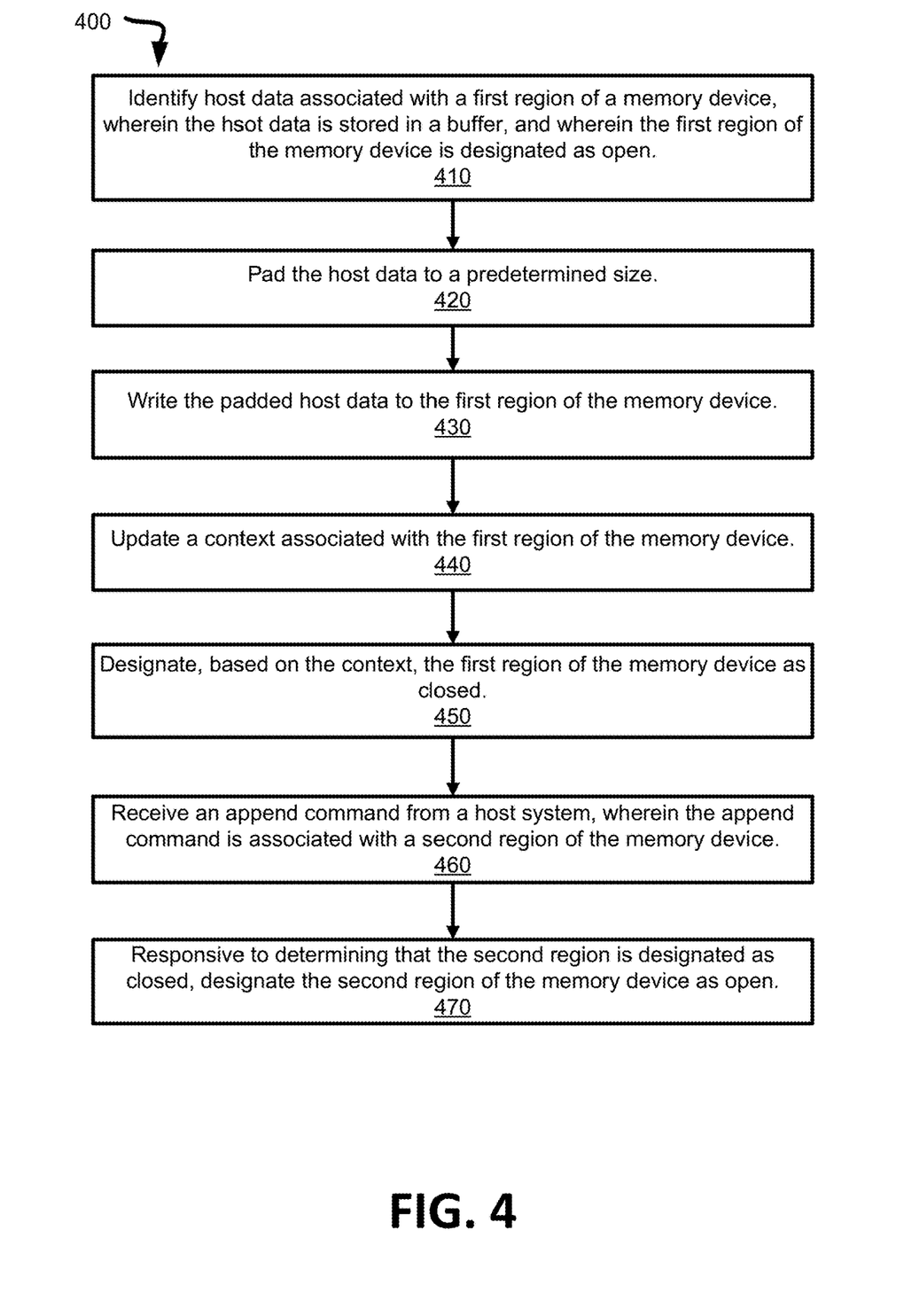
FIG. 4 is a flow diagram of an example method to support a large number of active regions in a memory sub-system using append mode, in accordance with some embodiments of the present disclosure.

FIG. 4 is a flow diagram of an example method 400 to support a large number of active regions in a memory sub-system using append mode, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory region manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic identifies host data associated with a first region of a memory device. The host data is stored in a buffer, and the first region of the memory device is designated as open. In embodiments, the processing logic stores one or more entries in a data structure. Each entry in the data structure includes a context associated with a region of the memory device. The context can include at least one of the following: a flag indicating whether the region of the memory device is open or closed, a logical block starting address associated with the region of the memory device, or a write pointer indicating the next writeable address of the region of the memory device.

At operation 420, the processing logic pads the host data to a predetermined size. The memory sub-system controller can determine the predetermined write size associated with the memory device. The memory sub-system controller can determine the size of the host data stored in the buffer, and subtract that from the predetermined write size. For example, write operations received from a host system can be as small as 4 KB, while the predetermined write size for a zone namespace memory device can be 64 KB. In an illustrative example, if the host data stored in the buffer is 4 KB, and the predetermined write size is 64 KB, the memory sub-system controller can determine that the host data stored in the buffer is 60 KB smaller than the predetermined write size. Hence, the memory sub-system controller can determine that the size of the default data to add to the host data to reach the predetermined size is 60 KB. The memory sub-system controller can pad the host data to the predetermined size by writing a default set of data to the buffer. The size of the default set of data matches the determined amount of data; i.e., in the illustrative example above, the size of the default set of data written to the host data stored in the buffer is 60 KB. The default set of data represents random data that is used to pad the host data stored in the buffer. The default set of data can be randomly generated data, or can be all zeros, for example.

At operation 430, the processing logic writes the padded host data to the first region of the memory device. That is, the processing logic executes a write command that includes the padded host data from the buffer to the first region of the memory device. The processing logic can use the context associated with the first region of the memory device to determine at which LBA to store the padded host data. For example, the processing logic can locate the first region of the memory device using the LBA Start stored in the context, as well as can write the padded host data to the address associated with the write pointer stored in the context.

At operation 440, the processing logic updates the context associated with the first region of the memory device. The processing logic can increment the write pointer associated with the first region of the memory device to reflect the next writeable address of the region. The write pointer can be stored in the context associated with the first region of the memory device.

At operation 450, the processing logic designates, based on the context, the first region of the memory device as closed. The processing logic can update the context associated with the first region of the memory device, specifically the processing logic can update the flag in the context to indicate that the first region of the memory is designated as closed.

At operation 460, the processing logic receives an append command from a host system. The append command is associated with a second region of the memory device. An append command is a write operation that specifies the first logical block of a region as the write position.

At operation 470, the processing logic determines that the second region of the memory device is designated as closed. That is, the processing logic uses the flag stored in the context associated with the second region of the memory device to determine that the second region is designated as closed. Responsive to determining that the second region of the memory device is closed, the processing logic designates the second region of the memory device as open. Further responsive to designating the first region of the memory as closed, the memory device can release the resources (e.g., the write buffer) associated with the first region of the memory device. As such, the processing logic can utilize the newly released resources (e.g., the write buffer) to execute the newly received append command.

Figure 5:
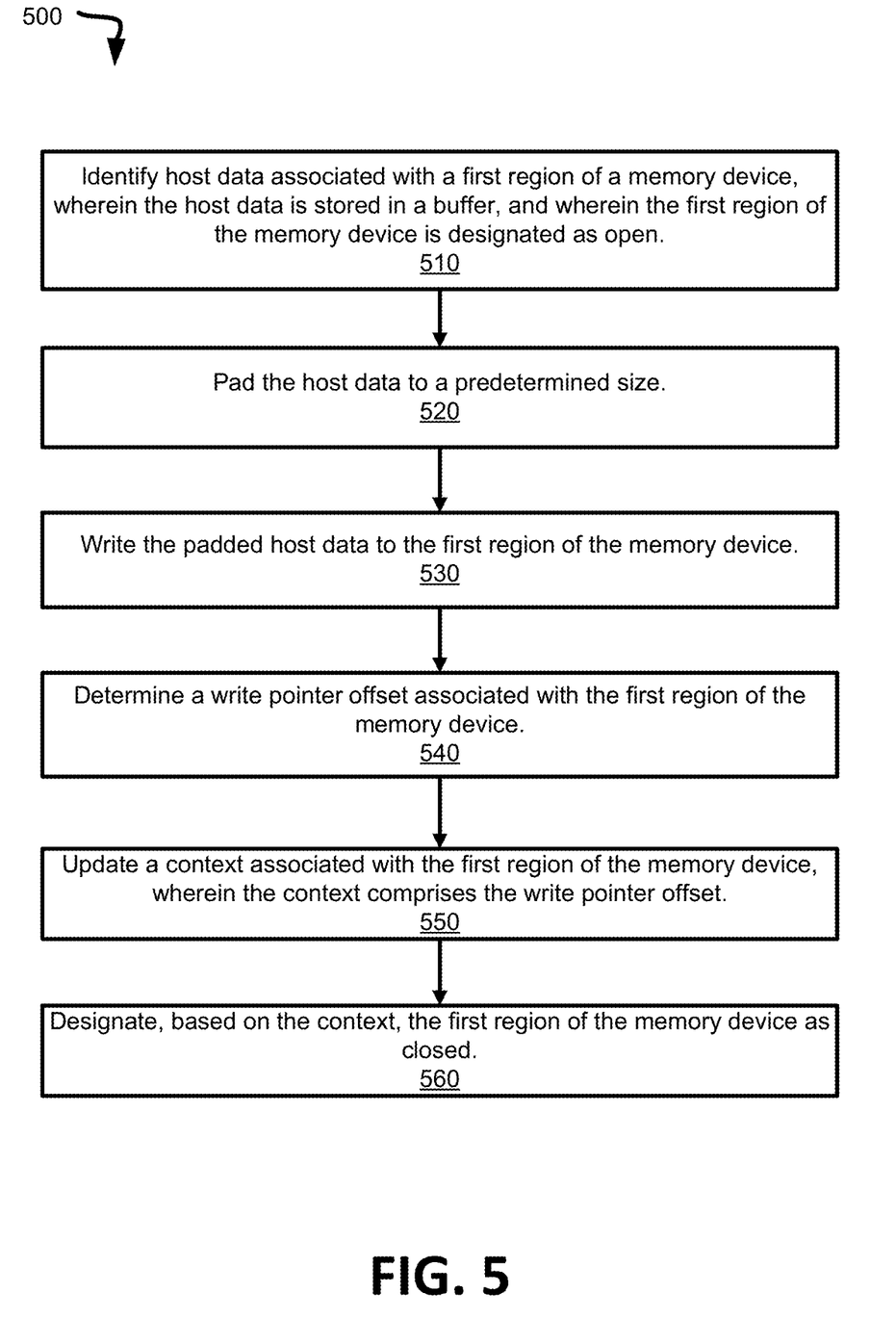
FIG. 5 is a flow diagram of an example method to support a large number of active regions in a memory sub-system using conventional write operations, in accordance with some embodiments of the present disclosure.

FIG. 5 is a flow diagram of an example method 500 to support a large number of active regions in a memory sub-system using conventional write operations, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory region manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic identifies host data associated with a first region of a memory device. The host data is stored in a buffer, and the first region of the memory device is designated as open. In embodiments, the processing logic stores one or more entries in a data structure. Each entry in the data structure includes a context associated with each region of the memory device. The context can include at least one of the following: a flag indicating whether the region of the memory device is open or closed, a logical block starting address associated with the region of the memory device, a write pointer indicating the next writeable address of the region of the memory device, or a write pointer offset associated with the region of the memory device.

At operation 520, the processing logic pads the host data to a predetermined size. The memory sub-system controller can determine the write size associated with the memory device. The memory sub-system controller can determine the size of the host data stored in the buffer, and subtract that from the predetermined write size. For example, write operations received from a host system can be as small as 4 KB, while the predetermined write size for a zone namespace memory device can be 64 KB. In an illustrative example, if the host data stored in the buffer is 4 KB, and the predetermined write size is 64 KB, the memory sub-system controller can determine that the host data stored in the buffer is 60 KB smaller than the predetermined write size. Hence, the memory sub-system controller can determine that the amount of data to add to the host data to reach the predetermined size is 60 KB. The memory sub-system controller can pad the host data to the predetermined size by writing a default set of data to the buffer. The size of the default set of data matches the determined size of data; i.e., in the illustrative example above, the size of the default set of data written to the host data stored in the buffer is 60 KB. The default set of data represents random data that is used to pad the host data stored in the buffer. The default set of data can be randomly generated data, or can be all zeros, for example.

At operation 530, the processing logic writes the padded host data to the first region of the memory device. That is, the processing logic executes a write command that includes the padded host data from the buffer to the first region of the memory device. The processing logic can use the context associated with the first region of the memory device to determine at which LBA to store the padded host data. For example, the processing logic can locate the first region of the memory device using the LBA Start stored in the context, as well as can write the padded host data to the address associated with the write pointer stored in the context plus the write pointer offset stored in the context.

At operation 540, the processing logic determines a write pointer offset associated with the first region of the memory device. The write pointer offset represents the difference between the write pointer associated with the memory region, and the next writeable LBA associated with the first region of the memory device. That is, because the processing logic padded the host data with a default set of data prior to transmitting the host data to the first region of the memory device, the write pointer associated with the first region of the memory device may no longer represent the actual next writeable address (i.e., the write pointer does not take into account the default data added to the host data). The write pointer offset makes up for such discrepancy.

At operation 550, the processing logic updates a context associated with the first region of the memory device. The context includes the write pointer offset. In embodiments, the context can be metadata associated with the regions of the memory device.

At operation 560, the processing logic designates the first region of the memory device as closed. The processing logic can update the context associated with the first region of the memory device, specifically the processing logic can update the flag in the context to indicate that the first region of the memory is closed.

In embodiments, the processing logic receives a write command from a host system. The write command is directed to a third region of the memory device. The processing logic determines, based on the context associated with the third region, that the third region of the memory device is designated as closed. Hence, after closing the first region of the memory device, the processing logic designates the third region as open. Further responsive to designating the first region of the memory as closed, the memory device can release the resources (e.g., the write buffer) associated with the first region of the memory device. As such, the processing logic can utilize the newly released resources (e.g., the write buffer) to execute the newly received write command.

In embodiments, the processing logic receives a read command from a host system. The read command includes a logical block address (LBA) at which the data to be read is stored. The processing logic identifies a second region of the memory device associated with the LBA. In embodiments, the processing logic can use a logical-to-physical (L2P) table to identify the region of the memory device at which data to be read is stored. The L2P mapping data structure maps the logical block addresses to memory chunks that are allocated to regions (or zones) of the memory device. The processing logic identifies a context associated with the second region of the memory device. The context can include a write pointer offset associated with the region. Prior to executing the read command, the processing logic adds the write pointer offset to the LBA.

Figure 6:
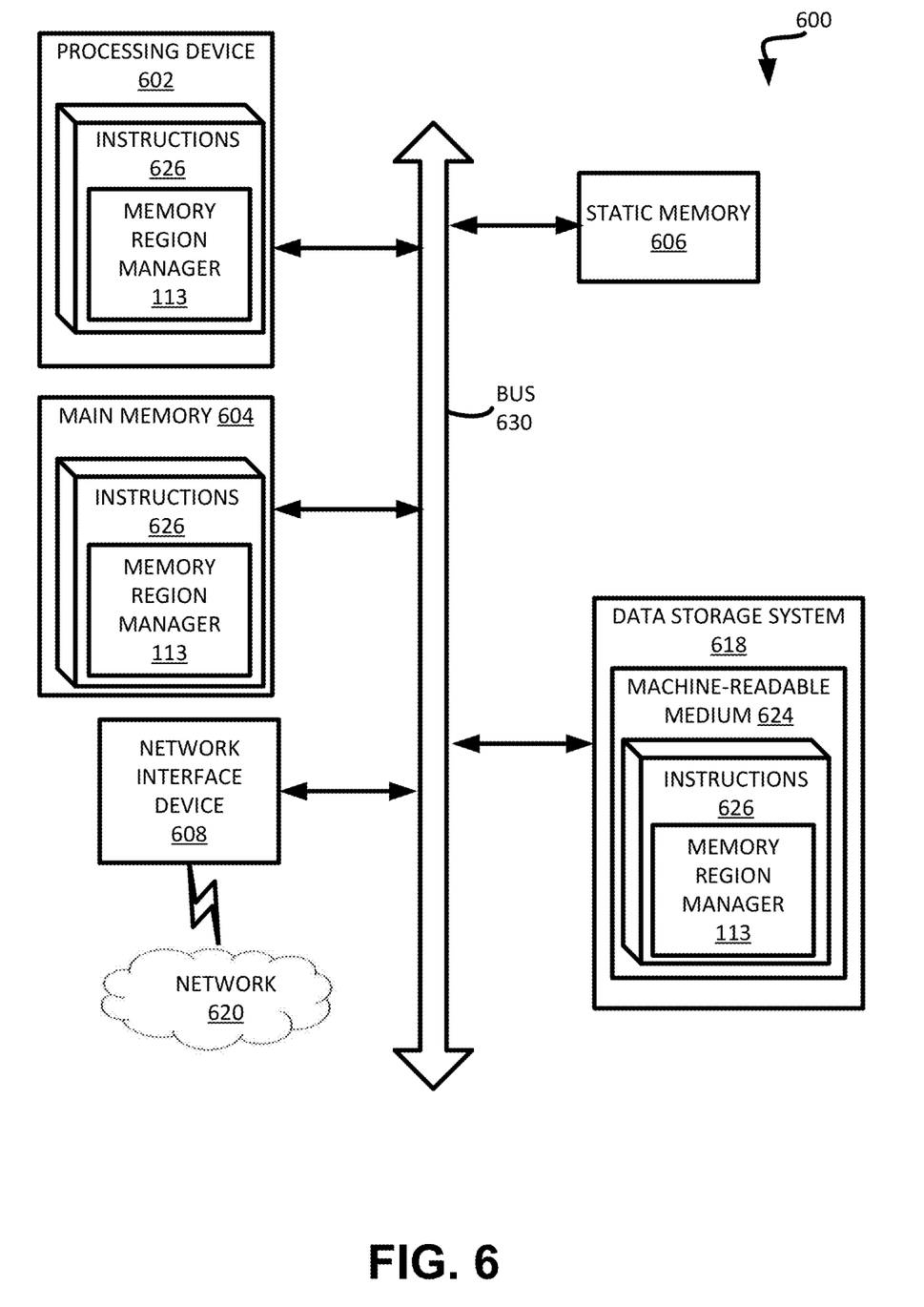
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory region manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a memory region manager component (e.g., the memory region manager 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   maintaining a context data structure for each active region of a plurality of active regions of a memory device, wherein the context data structure of a corresponding active region comprises an indicator indicating the corresponding active region as one of: open or closed, and wherein the context data structure of the corresponding active region comprises a number of padding operations performed with respect to the corresponding active region;
   identifying host data associated with a first active region of the memory device, wherein the host data is stored in a buffer, and wherein a first context data structure of the first active region of the memory device comprises a first indicator indicating the first active region as open;
   padding the host data to a predetermined size;
   writing the padded host data to the first active region of the memory device;
   responsive to writing the padded host data to the first active region of the memory device, incrementing the number of padding operations performed with respect to the first active region;
   updating the first context data structure of the first active region of the memory device, wherein the first context data structure comprises the number of padding operations performed with respect to the first active region;
   determining a position of a write pointer for the first active region of the memory device based on the number of padding operations performed with respect to the first active region; and
   responsive to writing the padded host data to the first active region of the memory device, updating the first indicator of the first context data structure to indicate the first active region of the memory device as closed.

2. The method of claim 1, wherein padding the host data to the predetermined size comprises:
   determining a first size of the host data stored in the buffer;
   determining, based on the first size, a second size of data to add to the host data to reach the predetermined size; and
   writing a default set of data to the buffer, wherein the default set of data is the second size of data.

3. The method of claim 1, wherein the context data structure of the corresponding active region of the memory device comprises at least one of: a logical block starting address associated with the corresponding active region of the memory device, or the write pointer indicating a next writeable address of the corresponding active region of the memory device; and wherein the indicator indicating the corresponding active region as one of open or closed comprises a flag.

4. The method of claim 1, wherein updating the first indicator of the first context data structure to indicate the first active region of the memory device as closed further comprises:
   receiving an append command from a host system, wherein the append command is associated with a second active region of the plurality of active regions of the memory device; and
   responsive to determining that a second context data structure of the second active region of the memory device comprises a second indicator indicating the second active region as closed, updating the second indicator of the second context data structure to indicate the second active region of the memory device as open.

5. The method of claim 1, wherein updating the first indicator of the first context data structure to indicate the first active region of the memory device as closed comprises:

updating a flag in the first context data structure of with the first active region of the memory device to indicate that the first active region of the memory device is closed.

6. A system comprising:
a memory device; and
a processing device coupled to the memory device, wherein the processing device is to perform operations comprising:
   maintain a context data structure for each active region of a plurality of active regions of the memory device, wherein the context data structure of a corresponding active region comprises an indicator indicating the corresponding active region as one of: open or closed, and wherein the context data structure of the corresponding active region comprises a number of padding operations performed with respect to the corresponding active region;
   identifying host data associated with a first active region of the memory device, wherein the host data is stored in a buffer, and wherein a first context data structure of the first active region of the memory device comprises a first indicator indicating the first active region as open;
   padding the host data to a predetermined size;
   writing the padded host data to the first active region of the memory device;
   determining a write pointer offset associated with the first active region of the memory device, wherein the write pointer offset comprises the number of padding operations performed with respect to the first active region of the memory device;
   responsive to writing the padded host data to the first active region of the memory device, incrementing the number of padding operations performed with respect to the first active region of the memory device;
   updating the first context data structure of the first active region of the memory device, wherein the first context data structure comprises the write pointer offset; and
   responsive to writing the padded host data to the first active region of the memory device, updating the first indicator of the first context data structure to indicate the first active region of the memory device as closed.

7. The system of claim 6, wherein padding the host data to the predetermined size comprises:
   determining a first size of the host data stored in the buffer;
   determining, based on the first size, a second size of data to add to the host data to reach the predetermined size; and
   writing a default set of data to the buffer, wherein the default set of data is the second size of data.

8. The system of claim 6, wherein determining the write pointer offset associated with the first active region of the memory device comprises:
   determining a next writeable logical block address (LBA) associated with the first active region of the memory device;
   determining a write pointer associated with the first active region of the memory device; and
   determining the write pointer offset associated with the first active region of the memory device by determining a difference between the next writeable LBA and the write pointer.

9. The system of claim 6, further comprising:
   receiving a read command from a host system, wherein the read command comprises a logical block address (LBA);
   identifying a second active region of the plurality of active regions of the memory device associated with the LBA;
   identifying a second context data structure of the second active region, wherein the second context data structure comprises a second write pointer offset; and
   adding the second write pointer offset to the LBA prior to executing the read command.

10. The system of claim 6, wherein updating the first indicator of the first context data structure to indicate the first active region of the memory device as closed further comprises:
   receiving a write command from a host system, wherein the write command comprises a third active region of the plurality of active regions of the memory device; and
   responsive to determining that a third context data structure of the third active region of the memory device comprises a third indicator indicating the third active region as closed, updating the third indicator of the third context data structure to indicate the third active region of the memory device as open.

11. The system of claim 6, wherein the context data structure of the first active region of the memory device comprises at least one of: a logical block starting address associated with the corresponding active region of the memory device, a write pointer indicating a next writeable address of the corresponding active region of the memory device, or a write pointer offset associated with the corresponding active region of the memory device; and wherein the indicator indicating the corresponding active region as one of open or closed comprises a flag.

12. A non-transitory computer-readable storage medium comprising instructions that, when executed by a processing device, cause the processing device to perform operations comprising:
   Maintaining a context data structure for each active region of a plurality of active regions of a memory device, wherein the context data structure a corresponding active region comprises an indicator indicating the corresponding active region as one of: open or closed, and wherein the context data structure of the corresponding active region comprises a number of padding operations performed with respect to the corresponding active region;
   Identifying host data associated with a first active region of the memory device, wherein the host data is stored in a buffer, and wherein a first context data structure of the first active region of the memory device comprises a first indicator indicating the first active region as open;
   padding the host data to a predetermined size;
   writing the padded host data to the first active region of the memory device;
   responsive to writing the padded host data to the first active region of the memory device, incrementing the number of padding operations performed with respect to the first active region;
   updating the first context data structure of the first active region of the memory device, wherein the context data structure comprises the number of padding operations performed with respect to the first active region; and responsive to writing the padded host data to the first active region of the memory device, updating the first indicator of the first context data structure to indicate the first active region of the memory device as closed.

13. The non-transitory computer-readable storage medium of claim 12, wherein padding the host data to the predetermined size comprises:
   determining a first size of the host data stored in the buffer;
   determining, based on the first size, a second size of data to add to the host data to reach the predetermined size; and
   writing a default set of data to the buffer, wherein the default set of data is the second size of data.

14. The non-transitory computer-readable storage medium of claim 12, wherein the context data structure of the corresponding active region of the memory device comprises at least one of: a logical block starting address associated with the corresponding active region of the memory device, or a write pointer indicating a next writeable address of the corresponding active region of the memory device; and wherein the indicator indicating the corresponding active region as one of open or closed comprises a flag.

15. The non-transitory computer-readable storage medium of claim 12, wherein updating the first indicator of the first context data structure to indicate the first active region of the memory device as closed further comprises:
   receiving an append command from a host system, wherein the append command is associated with a second active region of the plurality of active regions of the memory device; and
   responsive to determining that a second context data structure of the second active region of the memory device comprises a second indicator indicating the second active region as closed, updating the second indicator of the second context data structure to indicate the second active region of the memory device as open.

16. The non-transitory computer-readable storage medium of claim 12, wherein updating the first indicator of the first context data structure to indicate the first active region of the memory device as closed comprises:
   updating a flag in the first context data structure of the first active region of the memory device to indicate that the first active region of the memory device is closed.

* * * * *